United States Patent [19]
Warner

[11] Patent Number: 5,231,792
[45] Date of Patent: Aug. 3, 1993

[54] DOUBLE CONE INSECT TRAP

[75] Inventor: William B. Warner, Chandler, Ariz.

[73] Assignee: Farnam Companies, Inc., Phoenix, Ariz.

[21] Appl. No.: 915,253

[22] Filed: Jul. 20, 1992

[51] Int. Cl.⁵ ............................................. A01M 1/00
[52] U.S. Cl. ................................................. 43/122
[58] Field of Search ................................ 43/122, 121

[56] References Cited

U.S. PATENT DOCUMENTS 1,107,091  8/1914  Mielke .................................... 43/122
4,121,372 10/1978  Landaus .................................. 43/122

FOREIGN PATENT DOCUMENTS 1228 of 1866  United Kingdom ................. 43/122

Primary Examiner—Mark Rosenbaum
Assistant Examiner—Jeanne M. Elpel
Attorney, Agent, or Firm—Joseph H. Roediger

[57] ABSTRACT

An insect trap is disclosed which includes a double-cone structure having a receiving chamber for an attractive composition with a tapered surface and a retaining chamber for placement thereon. A conical indentation formed in the bottom of the retaining chamber provides a tapered surface which is spaced from that of the receiving chamber thus forming the first cone. The central portion of the indentation provides the second cone which is light-transmissive and has a central opening. The tapered surfaces of the chambers are opaque. An insect passageway is formed in the receiving chamber and communicates with the central opening. Thus, an insect entering the chamber through the tapered surfaces experiences light from above through the second cone and is drawn upward through the central opening into the retaining chamber where it is trapped.

9 Claims, 2 Drawing Sheets

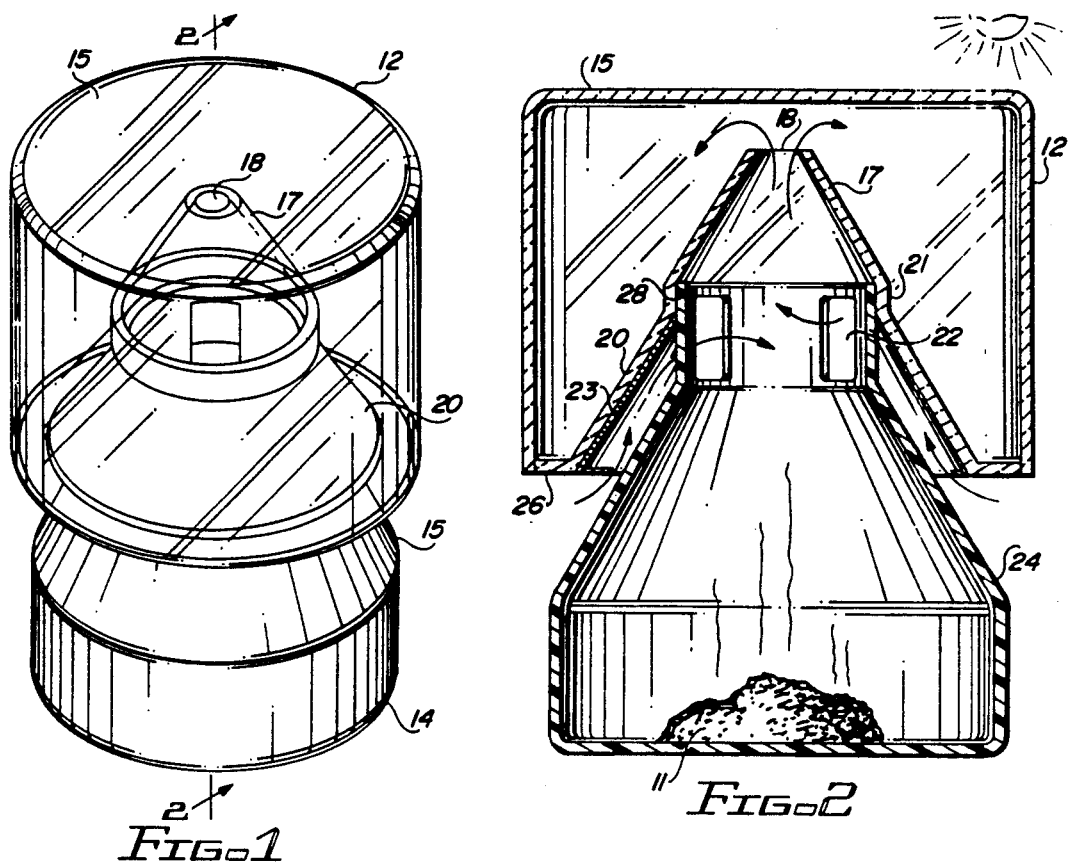
FIG. 1
FIG. 2
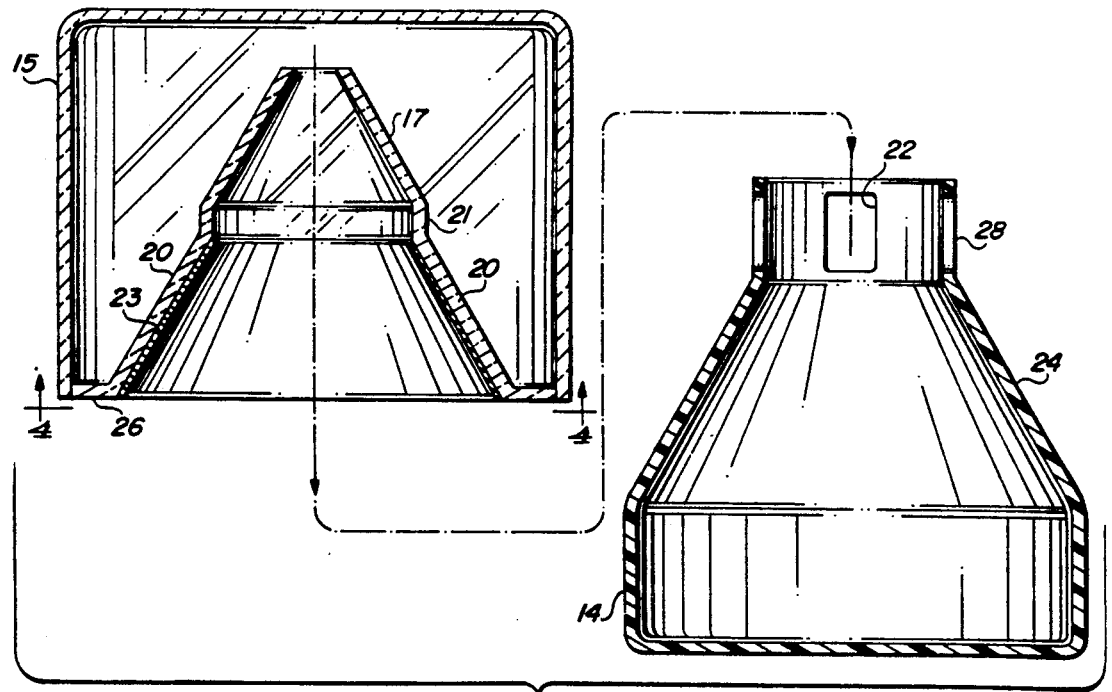
FIG. 3

DOUBLE CONE INSECT TRAP

BACKGROUND OF THE INVENTION

This invention relates to an improved insect trap and, in particular, to a trap having a double cone structure for use in combination with a insect attractant composition.

Throughout history, insects have distinguished themselves as persistent pests and health threats to both man and animals. Studies have been made documenting various insects as carriers of disease. The synanthropic fly is of particular concern to the public since it thrives and reproduces actively in both farm and home environments. As a result, substantial effort has been expended to develop trapping structures and chemical compositions for controlling the propagation of insects.

In the past, trapping structures utilizing wide mouth entry passages coupled with narrow exits in the shape of a cone have been employed to retain insects in a surrounding envelope which confines the insect for the rest of its life. The early trapping structures were designed to orient the entry and exit openings to take advantage of the insects tendency to favor travel in an upward direction toward the sun. Most of these devices relied upon natural attractants such as various food products, animal manure, putrifying meats, etc. to induce them to enter the wide opening. As a result, the number of flies and other insects entering the trap tended to be only a minor portion of the local insect population.

In the more recent past, sticky tapes, fly paper and hanging cylindrical traps with adhesive coatings on the exterior have been used to lower insect populations. Initially, these unsightly traps relied on the insect encountering these adhesive surfaces in their normal travels. The efficacy of the adhesive-based trap was enhanced by coloration studies which showed that insects favored certain colors, particularly the orange-yellow portion of the visible spectrum, as a preferred site to land on. In addition, studies showed that insects tended to land where other insects were already in place. This brought about the placement of simulated insects on the adhesive surfaces. All of these techniques enhanced the efficacy of the adhesive trap. Since these insect traps rely on an insect encountering the adhesive surface in its normal travels, the traps had to be publicly displayed and created an uncomfortable feeling especially when used in or viewed from a living environment.

Following the adhesive-based traps, the wide spread use of insecticides became favored to shorten the life of insects. However, recent studies have shown that use of insecticides in an indiscriminate manner has far greater ramifications than originally thought when the impact on man and his environment is examined. This has generated increasing interest in localized trapping of insects by the use of attractants. The attractants appeal to one or more of the senses of the insect to draw them to a central location. This central location need not be directly located in the normal living environment since the attractant causes the insects to travel to the attractant source. One such attractant used to draw synanthropic flies to a central location is the composition described and claimed in my U.S. Pat. No. 5,008,107, and used in the product marketed and sold by the Farnam Companies, Inc. Phoenix, Ariz. under the trademark APACHE.

Attractants of this type often utilize pheromones as sex attractants in combination with nitrogenous matter serving as feeding attractants. In the past few years, the use of attractants has proven to be a successful way to assist in controlling the insect population. The use of an attractant in combination with an insecticide is found to produce a rapid reduction in insect population, particularly in connection with flies. It is now possible to obtain attractants which through the use of pheromones result in a marked reduction in the female portion of the fly population thereby having an even greater impact on successive generations. The combination of attractant and insecticide has a possible drawback in that the insecticide is still being used to control the insect population. The insect ingesting a fly bait which contains an attractant and an insecticide is not confined at the distribution point. The insect tends to travel for a period after ingestion and die at a different location. This can create problems that reduces the desirability of using this type of control in many locations.

The combination of an improved insect trap which is designed to receive an attractant combination that assist in luring the insects to its interior is a highly desirable product. The absence of an insecticide coupled with the trapping or confining of the attracted insects not only reduces the population in the surrounding region, but also gathers the expired insects in the container itself. Furthermore, any environmental contamination occurring from either the insecticide or the insect ingesting it is essentially eliminated.

Accordingly, it is an object of the present invention to provide an improved insect trap for use in combination with an attractant composition to reduce insect populations. Furthermore, a major objective is to provide a structure which not only permits the attractant to exert its influence over the surrounding region, but also utilizes a novel double cone structure to draw the insects into the retaining chamber. In addition, the invention provides a structure which takes advantage of the tendency of insects to favor movement in an upward direction and toward an overlying light source. An important feature is the provision of a structure which shields a portion of the entering pathway from ambient light thereby permitting light from above to draw the insect into the trap.

SUMMARY OF THE INVENTION

This invention relates to an improved insect trap having a double cone structure designed to utilize ambient light to draw insects to the trap. The present trap is designed to contain an attractant composition thereby increasing its efficacy beyond that exhibited by traps relying on insects encountering them during their normal travels. The present trap is constructed so that entering insects find it difficult to leave and are retained therein for the remainder of their life.

The present insect trap includes a receiving chamber which contains the insect attractant, supports an overlying retaining chamber and defines in part the means of entry into the trap. The receiving chamber has a base member adapted to rest on a support surface and an enclosing wall which extends upwardly therefrom to provide a relatively large area opening for the addition of the attractant composition. A portion of the enclosing wall is preferably tapered inwardly and provides one surface of the entry passage. In addition, at least one insect passageway is formed in the enclosing wall proximate to the end of the wall. This passageway serves also to permit the region of effectiveness of the attractant to extend outwardly beyond the confines of the trap.

A trapping chamber containing an indentation in the bottom surface thereof is provided for placement upon the enclosing wall. The indentation includes an entry member, conical in shape, having a central region containing an opening dimensioned to permit the passage of insects therethrough. The outer region of the indentation comprises an opaque skirt flared outwardly and depending from the central region. When the two parts are assembled, the outwardly flared skirt is spaced adjacent a portion of the enclosing wall to define the insect pathway to within the trap. A surrounding envelope is attached to the skirt and completes the enclosure of the trapping chamber by surrounding the skirt and entry member to form a bounded volume. The only entry for the insect into the trapping chamber is through the opening contained in the central region. Thus, the present insect trap has a double cone structure with the first conical pathway being bounded by both the receiving chamber and the trapping chamber. The upper or second cone is located in the indentation formed in the bottom surface of the trapping chamber. As a result, the second cone overlies the first cone and the trap thus takes advantage of an insects tendency to favor travel in the upward direction.

In addition, a portion of the envelope and the entry member formed in the indentation in the bottom of the trapping chamber are light-transmissive. As a consequence thereof. An insect entering the first conical pathway defined by the enclosing wall of the receiving chamber and the skirt experiences light from the passageway formed in the enclosing wall. The insect is influenced not only by the pheromones and olfactory attractants contained within the receiving chamber, but is also encouraged to migrate upwardly toward the light along the pathway defined by the double conical structure. Once the insect has entered the trapping chamber, its view of a possible escape route is obscured by the opaque and darkened entryway between the double cones, encouraging it to remain in the well lit trapping chamber.

In its simplest form, the present insect trap is comprised only of the receiving chamber and the trapping chamber. The two parts frictionally engage one another to form a unitary structure. To load the trap, the trapping chamber is removed, the attractant material added to the receiving chamber and the parts are then recombined. The combination of the upwardly inclined conical shape, the shielding of the ambient light by the opaque skirt to reduce distractions coupled with the effects of the attractant have been found to provide an effective trap useful with a variety of insects. Those insects that enter the trapping chamber are unable to leave since they are continually drawn upward away from the opening in the central region in the entry member and obscured escape route therein and spend the rest of their lives attempting to escape toward sunlight entering the transparent outer walls of the trapping chamber.

Further features and advantages will become more readily apparent from the following detailed description of a preferred embodiment of the invention when viewed in conjunction with the accompanying drawings.

BRIEF DESCRIPTION OF THE DRAWINGS

FIG. 1 is a view in perspective of one embodiment of the invention.

FIG. 2 is a side view in section taken along line 2—2 of FIG. 1.

FIG. 3 shows the embodiment of FIG. 2 with the chambers separated.

DESCRIPTION OF THE PREFERRED EMBODIMENT

Figure 4:
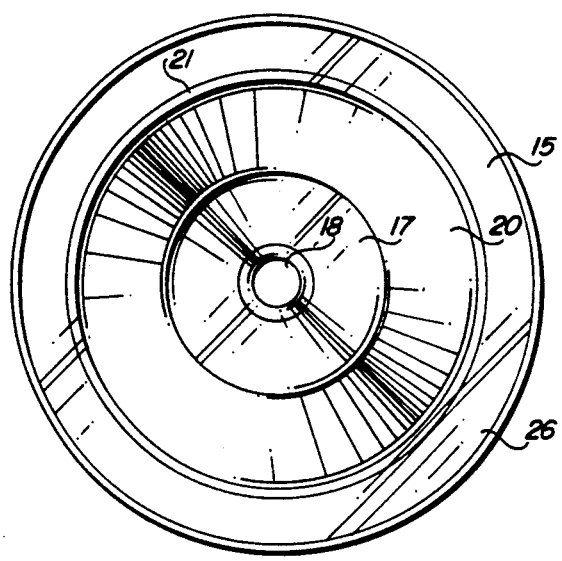
FIG. 4 is a top view of the embodiment of FIG. 1.

Referring now to FIGS. 1 and 2, the novel insect trap which is the subject of the present invention is shown in a cylindrical form and includes a trapping chamber 12 situated upon the receiving chamber 14. The trapping chamber is a bounded volume having a light-transmissive envelope 15 forming the exposed outer surface thereof. An indentation is formed in the bottom of the trapping chamber 12 and is surrounded by peripheral flange 26. The indentation includes skirt 20, a vertical engaging surface 21 and a central region 17. The central region is conical in shape and has an opening 18 centrally located therein which is dimensioned to provide a passage for insects.

The receiving chamber 14 has a basal surface with an enclosing wall 15 extending upwardly therefrom. The enclosing wall includes an inwardly tapered section 24 which terminates in a second engaging surface 28. The attractant composition 11 is added to the receiving chamber 14 through the central opening defined by the second engaging surface 28. A plurality of large area passageways 22 is formed about the circumference of the second engaging surface 28. The passageways are relatively large compared with the central opening 18 since they establish the airway through which the effects of the attractant 11 are outwardly disseminated. In addition, the light from above passes through the passageway 22 into the region between the skirt 20 and tapered section 24.

An opaque coating 23 is shown placed on the surface of the skirt 20. In addition, the receiving chamber 14 is made of moldable plastic with an opaque coating thereon. As a result, the inwardly and upwardly inclined pathway formed by the tapered section 24 and the skirt 20 is shielded from ambient light except that light transmitted through passageway 22. This structure capitalizes on the tendency of insects to favor travel paths which move upwardly toward a light source. Also, the attractant effects are experienced by the insects as they travel about beneath the pathway. As a result, the insect travels along the path of the arrows shown in FIG. 2.

Removal of the trapping chamber 12 from the receiving chamber 14 is shown in FIG. 3. This separation of parts permits the attractant composition to be readily placed in the receiving chamber when the device is placed in use. In addition, it permits a recharge of attractant composition if necessary. The engagement of the two parts to the present invention occurs by the dimensioning of the second engaging surface 28 and the mating engaging surface 21 provided between the central region 17 and skirt 20. The joining of the two parts is accomplished by placing the trapping chamber in position and rotating it gently while urging it downwardly so that the engaging surfaces 21 and 22 are in contact. The inward taper of the central region 17 provides the limiting means for vertical movement of the trapping chamber. It is recognized that threaded engagement can be provided by the formation of grooves in surfaces 21 and 28.

Figure 5:
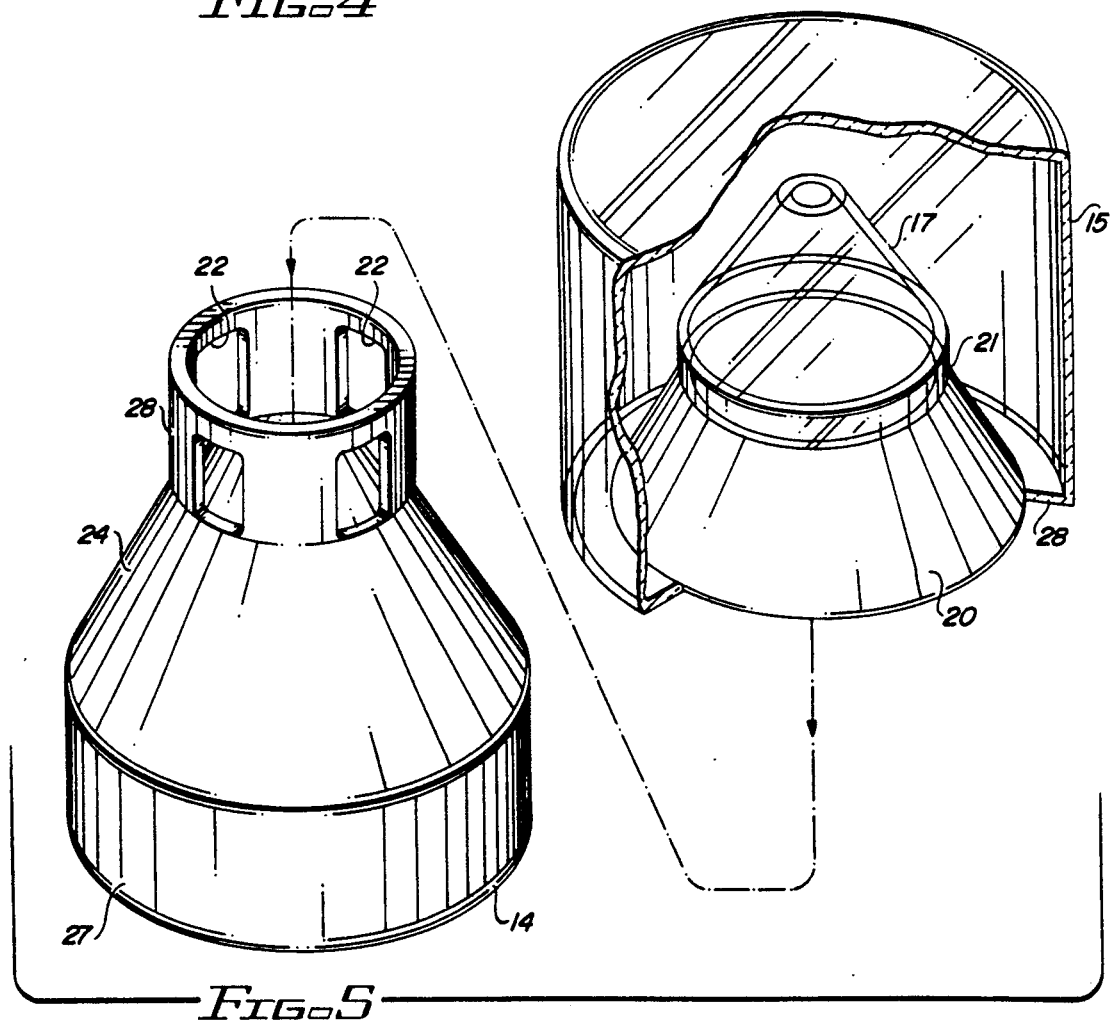
FIG. 5 is an exploded view of the embodiment of FIG. 1 with the trapping chamber shown in partial section.

As shown in FIGS. 3, 4 and 5, the trapping chamber includes a clear plastic envelope 15. The envelope provides the external surface of the chamber and is supported by flange 26. The inwardly tapered section forming the skirt 20 is terminated by the vertical engaging surface 21 which is then followed by the tapered central region 17. In the manufacturing process, the trapping chamber 12 is preferably made as two parts with the envelope separately formed and joined to the outer surface of flange 26. The conical surfaces of the indentation and flange 26 are formed as a single piece by a molding process. The two pieces are made of a light-transmissive plastic with the opaque coating 23 applied to the surface of skirt 20. The preferred colors are black for the entryway between tapered section 24 and skirt 20 with the rest of the receiving chamber having bright yellow to orange coating with a high reflectance in 300-450 NM wavelength range. The preferred embodiment utilizes a yellowish-orange color residing in that portion of the spectrum known to especially appeal to flies. The receiving chamber 14 is formed as a single piece typically of a transparent plastic with a similar opaque coating applied to the entire receiving chamber. However, it is recognized that opaque plastics can be used for the receiving chamber and the preferred embodiment shown is of this type. Thus, no coating on the receiving chamber is shown in the drawings. The opaque portion of the receiving chamber should include the tapered section 24 and the second engaging surface 28 in order to most strongly influence the insect by the ambient light from above. However, the shielding of the attractant from view is highly desirably and thus it is recommended that the entire receiving chamber be made opaque.

The preferred attractant composition is the attractant set forth in my U.S. Pat. No. 5,008,107. However, it is to be noted that many different attractants can be used if desired. For example, for the trapping of wasps, a liver flavored attractant such as a commercial cat food can be employed as shown in FIG. 2.

In operation, the present insect trap employs a double cone construction with the initial pathway bounded by the opaque colored skirt 20 and the opaque tapered section 24. An insect traveling nearby encounters the effects of the attractant which pass through the passageways 22 and outwardly from the entering pathway. The insect is attracted to the structure, lands on or near the tapered surface 24 and crawls upwardly toward the light at the passageways. The attractancy of the composition 11 increases as the insect travels toward the light. When the insect passes through the passageway, the light-transmission central region 17 leads the insect to travel upwardly in the direction of the arrows shown in FIG. 2 and out through the opening 18. Since the light is present above from the device, and the insects tend to favor upward travel, the likelihood of an insect making a successful exit from the trap is minimal. One advantage of making the entire receiving chamber 14 opaque is that the insect does not see any light from the region containing the attractant composition and therefore has a reduced incentive to attempt to move downwardly as it passes through the passageway 22.

While the above description has referred to a preferred embodiment of the invention, it is to be noted that many modifications and variations may be made therein without departing from the scope of the invention as claimed.

I claim:

1. Apparatus for attracting and retaining insects which comprises:
   a) a bottom enclosure having a base and a support wall extending therearound, said support wall forming a central opening above the base member;
   b) an insect passage formed in said support wall;
   c) a top enclosure having a bottom indentation for placement on the support wall, said indentation having a substantially conical surface with a central opening at the apex thereof, said central opening communicating with said passage, the placement of the top enclosure on the support wall forming a pathway therebetween, and
   d) an opaque region located on the conical surface of the bottom indentation, said region limiting the light incident on the pathway whereby an insect entering said pathway primarily encounters light entering said pathway from the passage in said support wall.

2. Apparatus in accordance with claim 1 wherein said support wall includes a section having an inward taper.

3. Apparatus in accordance with claim 2 wherein the tapered section of the support wall is substantially parallel to the bottom indentation of the top enclosure.

4. An insect trap comprising:
   a) a receiving chamber for containing an insect attractant, said chamber having a base member and an enclosing wall extending upwardly therefrom;
   b) a passageway formed in the enclosing wall for the passage of insects therethrough;
   c) a trapping chamber for placement upon the enclosing wall, said chamber including:
      i. an entry member having a central region containing an opening dimensioned to permit the passage of insects therethrough;
      ii. an opaque skirt depending from said central region and spaced adjacent the enclosing wall to define a pathway therebetween, and
      iii. an envelope attached to the skirt for surrounding the skirt and entry member to form a bounded volume, at least a portion of the envelope and the entry member being light-transmissive whereby an insect entering the pathway experiences light from above the pathway.

5. The invention in accordance with claim 4 wherein the enclosing wall of said receiving chamber includes a region having an inward taper spaced adjacent the opaque skirt.

6. The invention in accordance with claim 5 wherein the central region of the entry member is conical.

7. The invention in accordance with claim 6 wherein said entry member includes an attachment section for engaging the enclosing wall of the receiving chamber, said attachment section being positioned between the central region and the skirt.

8. The invention in accordance with claim 7 wherein the skirt of the trapping chamber extends below the passageway formed in the enclosing wall whereby the pathway is inclined upwardly into the envelope.

9. The invention in accordance with claim 8 wherein said receiving chamber is opaque.

* * * * *